(12) United States Patent
Du et al.

(10) Patent No.: US 10,936,937 B2
(45) Date of Patent: Mar. 2, 2021

(54) CONVOLUTION OPERATION DEVICE AND CONVOLUTION OPERATION METHOD

(71) Applicant: Kneron, Inc., San Diego, CA (US)

(72) Inventors: Li Du, La Jolla, CA (US); Yuan Du, Los Angeles, CA (US); Chun-Chen Liu, San Diego, CA (US)

(73) Assignee: KNERON, INC., San Diego, CA (US)

( * ) Notice: Subject to any disclaimer, the term of this patent is extended or adjusted under 35 U.S.C. 154(b) by 599 days.

(21) Appl. No.: 15/801,623

(22) Filed: Nov. 2, 2017

(65) Prior Publication Data

US 2018/0137407 A1 May 17, 2018

(30) Foreign Application Priority Data

Nov. 14, 2016 (TW) .................................. 105137129

(51) Int. Cl.
*G06N 3/04* (2006.01)
*G06N 3/063* (2006.01)
*G06F 17/15* (2006.01)
*G06N 3/08* (2006.01)

(52) U.S. Cl.
CPC .............. *G06N 3/04* (2013.01); *G06F 17/15* (2013.01); *G06N 3/0454* (2013.01); *G06N 3/063* (2013.01); *G06N 3/08* (2013.01)

(58) Field of Classification Search
CPC ........ G06N 3/04; G06N 3/0454; G06N 3/063; G06F 17/10; G06F 17/15; G06F 17/153; G06F 17/16; G06F 7/5443; G06F 7/57
USPC .................................................. 708/315, 603
See application file for complete search history.

(56) References Cited

U.S. PATENT DOCUMENTS

2018/0005074 A1\* 1/2018 Shacham ............... G06N 3/063
2018/0129936 A1\* 5/2018 Young .................. G06N 3/0454

FOREIGN PATENT DOCUMENTS

| CN | 105335747 A | 2/2016 |
| CN | 105869117 A | 8/2016 |
| TW | 201627923 A | 8/2016 |

OTHER PUBLICATIONS

X. Han et al., CNN-MERP: An FPGA-Based Memory-Efficient Reconfigurable Processor for Forward and Backward Propagation of Convolutional Neural Networks, 2016 IEEE 34th International Conference on Computer Design (ICCD) conference presentation, Oct. 2-5, 2016, IEEE 2016 (Year: 2016).\*

(Continued)

*Primary Examiner* — Andrew Caldwell
*Assistant Examiner* — Emily E Larocque
(74) *Attorney, Agent, or Firm* — Muncy, Geissler, Olds & Lowe, P.C.

(57) ABSTRACT

A convolution operation device includes a convolution calculation module, a memory and a buffer device. The convolution calculation module has a plurality of convolution units, and each convolution unit performs a convolution operation according to a filter and a plurality of current data, and leaves a part of the current data after the convolution operation. The buffer device is coupled to the memory and the convolution calculation module for retrieving a plurality of new data from the memory and inputting the new data to each of the convolution units. The new data are not a duplicate of the current data. A convolution operation method is also disclosed.

7 Claims, 5 Drawing Sheets

(56) References Cited

OTHER PUBLICATIONS

L. Song et al., C-Brain: A Deep Learning Accelerator that Tames the Diversity of CNNs through Adaptive Data-level Parallelization, DAC'16, Jun. 5-9, 2016 (Year: 2016).*

L. Du et al., A Reconfigurable Streaming Deep Convolutional Neural Network Accelerator for Internet of Things, IEEE Transactions on Circuits and Systems-I: Regular Papers, vol. 65, No. 1 Jan. 2018 (Year: 2018).*

* cited by examiner

CONVOLUTION OPERATION DEVICE AND CONVOLUTION OPERATION METHOD

CROSS REFERENCE TO RELATED APPLICATIONS

This Non-provisional application claims priority under 35 U.S.C. § 119(a) on Patent Application No(s). 105137129 filed in Taiwan, Republic of China on Nov. 14, 2016, the entire contents of which are hereby incorporated by reference.

BACKGROUND OF THE INVENTION

Field of Invention

The present invention relates to a convolution operation device and method for a data stream.

Related Art

Deep learning is an important technology for developing artificial intelligence (AI). In the recent years, the convolutional neural network (CNN) is developed and applied in the identification of the deep learning field. Compared with other deep learning architectures, especially in the mode classification field such as picture and voice identifications, the convolutional neural network can directly process the original pictures or data without the complex preprocessing. Thus, it becomes more popular and has a better identification result.

However, the convolution operation usually consumes a lot of performance. In the convolutional neural network application, especially for the convolution operation or continuous parallel operation, the convolution operation can occupy most performance of the processor. In addition, the multimedia application in the internet usually utilizes the stream data. Accordingly, it is desired to provide a convolution operation device that has good operation performance and low power consumption when processing the data with convolution operation and continuous parallel operation, and can be applied to process the data stream.

SUMMARY OF THE INVENTION

In view of the foregoing, an objective of the present invention is to provide a convolution operation device and method capable of processing data streams.

The present invention discloses a convolution operation device, which includes a convolution calculation module, a memory and a buffer device. The convolution calculation module has a plurality of convolution units, and each of the convolution units performs a convolution operation according to a filter and a plurality of current data, and leaves a part of the current data after the convolution operation. The buffer device is coupled to the memory and the convolution calculation module. The buffer device retrieves a plurality of new data from the memory and inputs the new data to the convolution units, and the new data are not a duplicate of the current data.

In one embodiment, the convolution units performs a next convolution operation according to the filter, the left part of the current data, and the new data.

In one embodiment, a stride for moving the filter is smaller than a shortest width of the filter.

In one embodiment, the convolution operation device further includes an interleaving sum unit coupled to the convolution operation module. The interleaving sum unit generates a feature output result according to a result of the convolution operation.

In one embodiment, the convolution operation device includes a plurality of the convolution operation modules, and the convolution units and the interleaving sum unit are operated in a low-scale convolution mode or a high-scale convolution mode. In the low-scale convolution mode, the interleaving sum unit is configured to sum results of the convolution operations of the convolution operation modules by interleaving so as to output sum results. In the high-scale convolution mode, the interleaving sum unit is configured to sum the results of the convolution operations of the convolution units as outputs.

In one embodiment, the convolution operation device further includes a sum buffer unit coupled to the interleaving sum unit and the buffer device for registering the feature output result. After finishing selected convolution operations, the buffer device retrieves all data registered in the sum buffer unit and writes the retrieved data into the memory.

In one embodiment, the sum buffer unit includes a partial sum region and a pooling region. The partial sum region is configured for registering data outputted from the interleaving sum unit. The pooling region performs a pooling operation with the data registered in the partial sum region.

In one embodiment, the pooling operation is a max pooling or an average pooling.

In one embodiment, the convolution operation device further includes a data reading controller and an instruction decoder. The instruction decoder receives a control instruction from the data reading controller and decodes the control instruction for obtaining a size, a number of columns, a number of rows, a feature number of data inputted from the memory, and an initial address of the inputted data in the memory.

In one embodiment, each of the convolution units includes a plurality of low-scale convolution outputs and a high-scale convolution output. In the low-scale convolution outputs, each of the convolution units performs a low-scale convolution operation for outputting the convolution result. In the high-scale convolution output, each of the convolution units performs a high-scale convolution operation for outputting a high-scale convolution result.

In addition, the present invention also discloses a convolution operation method for a data stream, which includes the following steps of: sliding a convolution operation window; retrieving data, which are not processed in a previous convolution operation, from the data stream; performing a current convolution operation with data left in a convolution operation module and the data retrieved from the data stream according to a filter coefficient of the convolution operation window; and leaving a part of the data for the current convolution operation in the convolution operation module, wherein the left part of the data is provided for a next convolution operation.

In one embodiment, the convolution operation method further includes a step of: performing a partial operation for a consecutive layer of a convolutional neural network according to the results of the current convolution operation.

In one embodiment, a stride for a sliding window of the convolution operation is smaller than a shortest width of the sliding window.

In one embodiment, the convolution operation method further includes the following steps of: selecting one of a low-scale convolution mode and a high-scale convolution mode for performing the convolution operation; and when selecting the low-scale convolution mode, summing results of the convolution operations of the convolution operations corresponding to modules by interleaving with an interleaving sum unit so as to output sum results.

In one embodiment, the convolution operation method further includes a step of: performing a pooling operation with the results of the convolution operations.

In one embodiment, the pooling operation is a max pooling or an average pooling.

As mentioned above, each convolution unit of the convolution operation device can leave a part of the current data after the convolution operation, and the buffer device retrieves a plurality of new data and inputs the new data to the convolution unit. The new data is not a duplicate of the current data. Thus, the performance of the convolution operation can be enhanced, so that this invention is suitable for the convolution operation for data stream. When performing data process by convolution operation and continuous parallel operation, the operation performance and low power consumption expressions are excellent, and these operations can be applied to process data stream.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
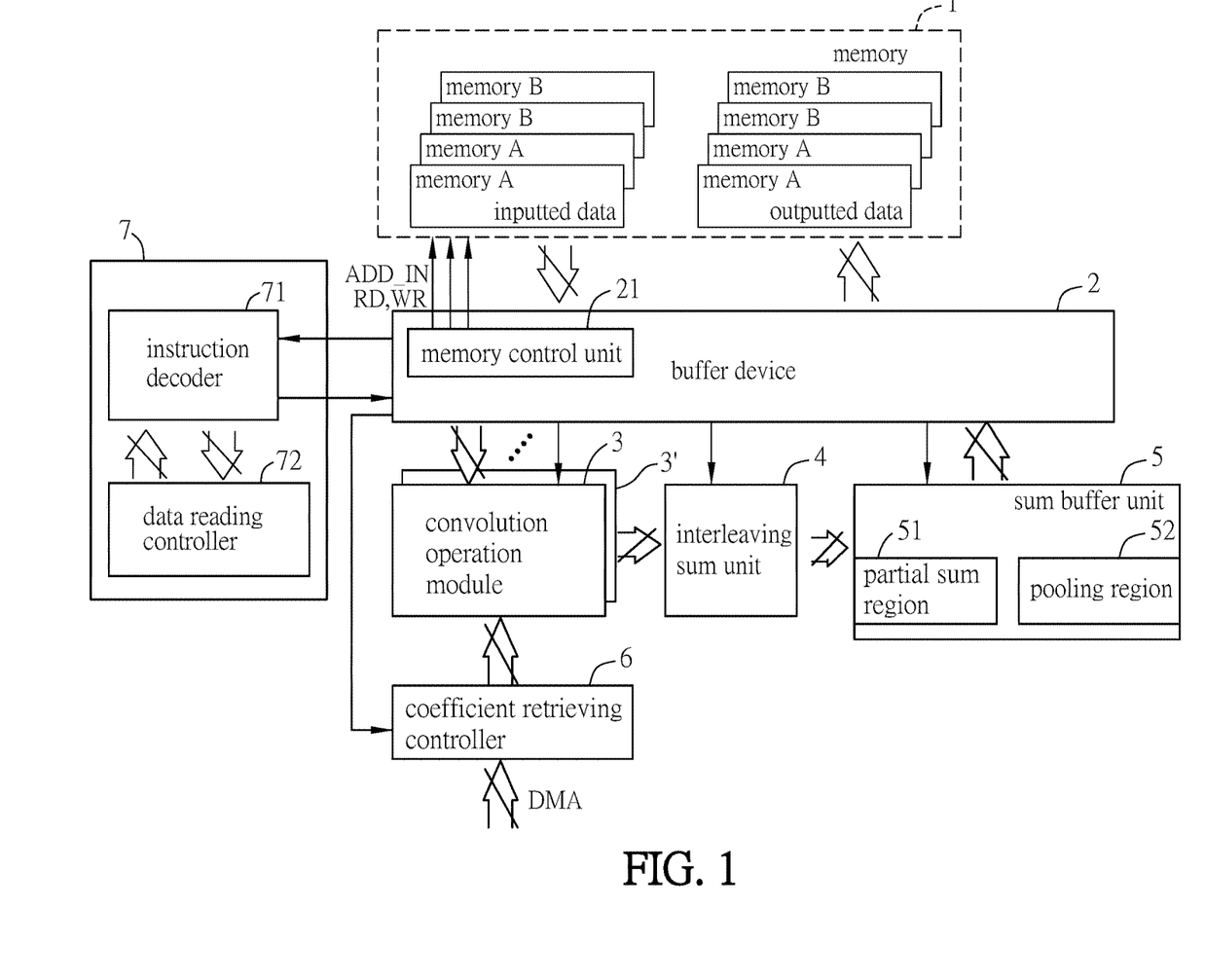
FIG. 1 is a block diagram of a convolution operation device according to an embodiment of the invention.

FIG. 1 is a block diagram of a convolution operation device according to an embodiment of the invention. As shown in FIG. 1, the convolution operation device includes a memory 1, a buffer device 2, a convolution calculation module 3, an interleaving sum unit 4, a sum buffer unit 5, a coefficient retrieving controller 6 and a control unit 7. The convolution operation device can be applied to convolutional neural network (CNN).

The memory 1 stores the data for the convolution operations. The data include, for example, image data, video data, audio data, statistics data, or the data of any layer of the convolutional neural network. The image data may contain the pixel data. The video data may contain the pixel data or movement vectors of the frames of the video, or the audio data of the video. The data of any layer of the convolutional neural network are usually 2D array data, such as 2D array pixel data. In this embodiment, the memory 1 is a SRAM (static random-access memory), which can store the data for convolution operation as well as the results of the convolution operation. In addition, the memory 1 may have multiple layers of storage structures for separately storing the data for the convolution operation and the results of the convolution operation. In other words, the memory 1 can be a cache memory configured in the convolution operation device.

All or most data can be stored in an additional device, such as another memory (e.g. a DRAM (dynamic random access memory)). All or a part of these data are loaded into the memory 1 from the another memory when executing the convolution operation. Then, the buffer device 2 inputs the data into the convolution operation module 3 for executing the convolution operations. If the inputted data are from the data stream, the latest data of the data stream are written into the memory 1 for the convolution operations.

The buffer device 2 is coupled to the memory 1, the convolution operation module 3 and the interleaving buffer unit 5. In addition, the buffer device 2 is also coupled to other components of the convolution operation device such as the interleaving sum unit 4 and the control unit 7. Regarding to the image data or the frame data of video, the data are processed column by column and the data of multiple rows of each column are read at the same time. Accordingly, within a clock, the data of one column and multiple rows in the memory 1 are inputted to the buffer device 2. In other words, the buffer device 2 is functioned as a column buffer. In the operation, the buffer device 2 can retrieve the data for the operation of the convolution operation module 3 from the memory 1, and modulate the data format to be easily written into the convolution operation module 3. In addition, the buffer device 2 is also coupled with the sum buffer unit 5, the data processed by the sum buffer unit 5 can be reordered by the buffer device 2 and then transmitted to and stored in the memory 1. In other words, the buffer device 2 has a buffer function as well as a function for relaying and registering the data. In more precisely, the buffer device 2 can be a data register with reorder function.

To be noted, the buffer device 2 further includes a memory control unit 21. The memory control unit 21 can control the buffer device 2 to retrieve data from the memory 1 or write data into the memory 1. Since the memory access width (or bandwidth) of the memory 1 is limited, the available convolution operations of the convolution operation module 3 is highly related to the access width of the memory 1. In other words, the operation performance of the convolution operation module 3 is limited by the access width. When reaching the bottleneck of the input from the memory, the performance of the convolution operation can be impacted and decreased.

The convolution operation module 3 includes a plurality of convolution units, and each convolution unit executes a convolution operation based on a filter and a plurality of current data. After the convolution operation, a part of the current data is left for the next convolution operation. The buffer device 2 retrieves a plurality of new data from the memory 1, and the new data are inputted from the buffer device 2 to the convolution unit. The new data are not a duplicate of the current data. For example, the new data have not been used in the previous convolution operation, but are used in the current convolution operation. The convolution unit of the convolution operation module 3 can execute a next convolution operation based on the filter, the left part of the current data, and the new data. The interleaving sum unit 4 is coupled to the convolution operation module 3 and generates a feature output result according to the result of the convolution operation. The sum buffer unit 5 is coupled to the interleaving sum unit 4 and the buffer device 2 for registering the feature output result. When the selected convolution operations are finished, the buffer device 2 can write all data registered in the sum buffer unit 5 into the memory 1.

The coefficient retrieving controller 6 is coupled to the convolution operation module 3, and the control unit 7 is coupled to the buffer device 2. In practice, the convolution operation module 3 needs the inputted data and the coefficient of filter for performing the related operation. In this embodiment, the needed coefficient is the coefficient of the 3×3 convolution unit array. The coefficient retrieving controller 6 can directly retrieve the filter coefficient from external memory by direct memory access (DMA). Besides, the coefficient retrieving controller 6 is also coupled to the buffer device 2 for receiving the instructions from the control unit 7. Accordingly, the convolution operation module 3 can utilize the control unit 7 to control the coefficient retrieving controller 6 to perform the input of the filter coefficient.

The control unit 7 includes an instruction decoder 71 and a data reading controller 72. The instruction decoder 71 receives an instruction from the data reading controller 72, and then decodes the instruction for obtaining the data size of the inputted data, columns and rows of the inputted data, the feature number of the inputted data, and the initial address of the inputted data in the memory 1. In addition, the instruction decoder 71 can also obtain the type of the filter and the outputted feature number from the data reading controller 72, and output the proper blank signal to the buffer device 2. The buffer device 2 can operate according to the information provided by decoding the instruction as well as controlling the operations of the convolution operation module 3 and the sum buffer unit 5. For example, the obtained information may include the clock for inputting the data from the memory 1 to the buffer device 2 and the convolution operation module 3, the sizes of the convolution operations of the convolution operation module 3, the reading address of the data in the memory 1 to be outputted to the buffer device 2, the writing address of the data into the memory 1 from the sum buffer unit 5, and the convolution modes of the convolution operation module 3 and the buffer device 2.

In addition, the control unit 7 can also retrieve the needed instruction and convolution information from external memory by data memory access. After the instruction decoder 71 decodes the instruction, the buffer device 2 retrieves the instruction and the convolution information. The instruction may include the size of the stride of the sliding window, the address of the sliding window, and the numbers of columns and rows of the image data.

The sum buffer unit 5 is coupled to the interleaving sum unit 4. The sum buffer unit 5 includes a partial sum region 51 and a pooling region 52. The partial sum region 51 is configured for registering data outputted from the interleaving sum unit 4. The pooling region 52 performs a pooling operation with the data registered in the partial sum region 51. The pooling operation is a max pooling or an average pooling.

For example, the convolution operation results of the convolution operation module 3 and the output feature results of the interleaving sum unit 4 can be temporarily stored in the partial sum region 51 of the sum buffer unit 5. Then, the pooling region 52 can perform a pooling operation with the data registered in the partial sum region 51. The pooling operation can obtain the average value or max value of a specific feature in one area of the inputted data, and use the obtained value as the fuzzy-rough feature extraction or statistical feature output. This statistical feature has lower dimension than the above features and is benefit in improving the operation results.

To be noted, the partial operation results of the inputted data are summed (partial sum), and then registered in the partial sum region 51. The partial sum region 51 can be referred to a PSUM unit, and the sum buffer unit 5 can be referred to a PSUM buffer module. In addition, the pooling region 52 of this embodiment obtains the statistical feature output by max pooling. In other aspects, the pooling region 52 may obtain the statistical feature output by average pooling. This invention is not limited. After inputted data are all processed by the convolution operation module 3 and the interleaving sum unit 4, the sum buffer unit 5 outputs the final data processing results. The results can be stored in the memory 1 through the buffer device 2, and outputted to other components through the memory 1. At the same time, the convolution operation modules 3 and the interleaving sum unit 4 can continuously obtain the data feature and perform the related operations, thereby improving the process performance of the convolution operation device.

The convolution operation device may include a plurality of convolution operation modules 3. The convolution units of the convolution operation modules 3 and the interleaving sum unit 4 can optionally operate in the low-scale convolution mode or a high-scale convolution mode. In the low-scale convolution mode, the interleaving sum unit 4 is configured to sum results of the convolution operations of the convolution operation modules 3 by interleaving so as to output sum results. In the high-scale convolution mode, the interleaving sum unit 4 is configured to sum the results of the convolution operations of the convolution units as outputs.

For example, the control unit 7 can receive a control signal or a mode instruction, and then select one of the convolution modes for the other modules and units according to the received control signal or mode instruction. The control signal or mode instruction can be outputted from another control unit or processing unit.

Figure 2:
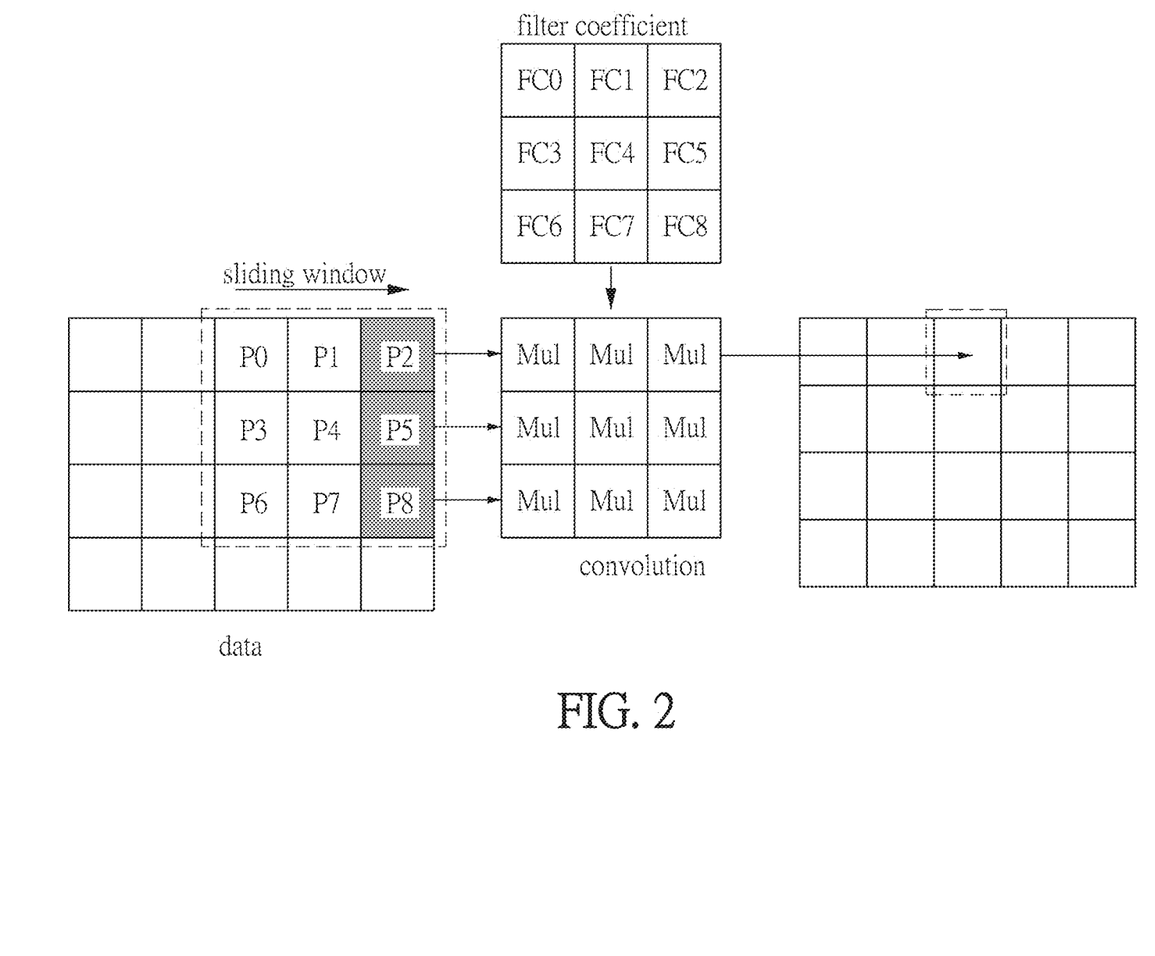
FIG. 2 is a schematic diagram showing the convolution operation device of FIG. 1 performing a convolution operation with 2D data.

FIG. 2 is a schematic diagram showing the convolution operation device of FIG. 1 performing a convolution operation with 2D data. The 2D data has multiple columns and multiple rows, and the 2D data can be an image data such as 5×4 pixels. As shown in FIG. 2, a filter of a 3×3 array can be used in the convolution operation for 2D data. The filter has the coefficients FC0~FC8, and the stride of the filter is smaller than the shortest width of the filter. The size of the filter matches the sliding window or convolution operation window. The sliding window can move on the 5×4 image. In each movement, a 3×3 convolution operation (e.g. a high-scale convolution mode) is executed regarding to the data P0~P8 corresponding to the window. The result of the convolution operation is named as a feature value. The moving distance of the sliding window S is a stride. The size of the stride is smaller than the size of the sliding window or the convolution size. In this embodiment, the stride of the sliding window is smaller than the distance of three pixels. In general, the adjacent convolution operations usually have overlapped data. If the stride is 1, the data P2, P5 and P8 are the new data, and the data P0, P1, P3, P4, P6 and P7 have been inputted in the previous convolution operation. In the convolutional neural network, the common size of the sliding window can be 1×1, 3×3, 5×5, 7×7, or the likes. In this embodiment, the size of the sliding window is 3×3.

Figure 3:
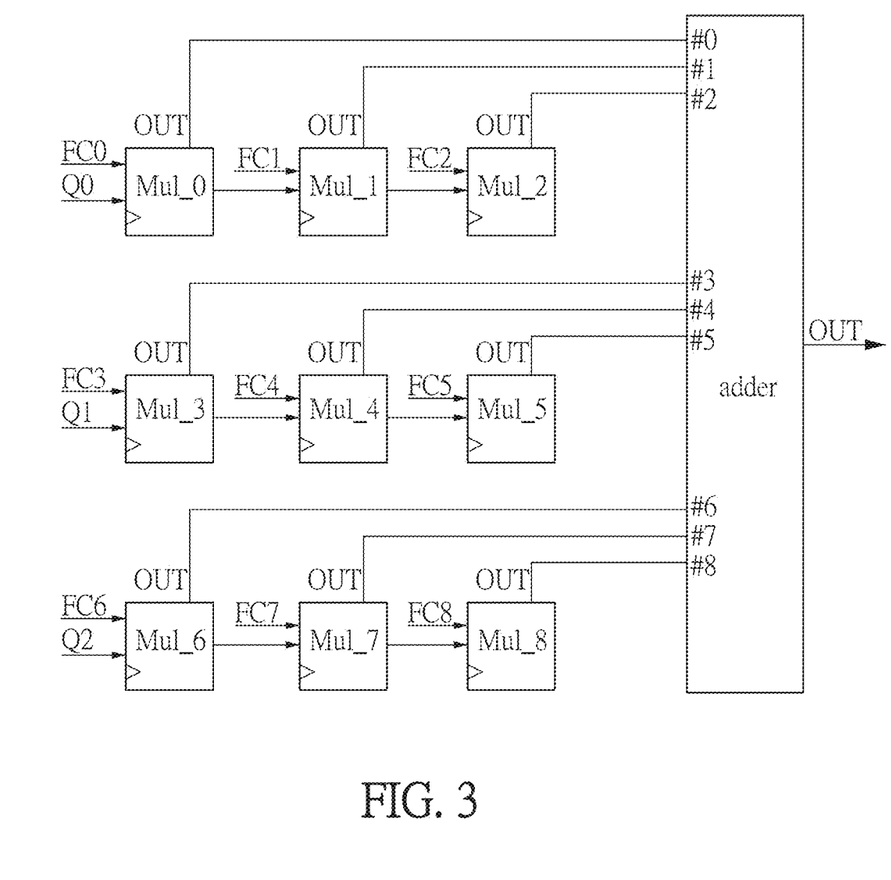
FIG. 3 is a schematic diagram showing a convolution unit of the convolution operation device of FIG. 1.

FIG. 3 is a schematic diagram showing a convolution unit of the convolution operation device of FIG. 1. As shown in FIG. 3, the convolution unit has 9 multipliers Mul_0~Mul_8 in a 3×3 array. Each multiplier has a data input, a filter coefficient input, and a multiplication output OUT. The data input and the filter coefficient input are the two multiplication operation inputs of each multiplier. The outputs OUT of the multipliers are connected to the inputs #0~#8 of the adders. The adders can add the outputs of the multipliers and then generate a convolution output OUT. After finishing a convolution operation, the multipliers Mul_0, Mul_3 and Mul_6 can output the current data (the current inputs Q0, Q1 and Q2) to the next multipliers Mul_1, Mul_4 and Mul_7. The multipliers Mul_1, Mul_4 and Mul_7 can output the current data (the previous inputs Q0, Q1 and Q2) to the next multipliers Mul_2, Mul_5 and Mul_8. Accordingly, the data inputted to the convolution units in the previous operation can be left for the current or next convolution operation. The multipliers Mul_0, Mul_3 and Mul_6 can receive new data Q0, Q1 and Q2 in the next convolution operation. The patch between two consequent convolution operations is at least one clock.

In general, the filter coefficients are not renewed in every operation. For example, the coefficients FC0~FC8 are inputted to the multipliers Mul_0~Mul_8 and left in the multipliers Mul_0~Mul_8 for the following multiplication operations. Otherwise, the coefficients FC0~FC8 must be continuously inputted to the multipliers Mul_0~Mul_8.

In other aspects, the convolution units can be in a 5×5 array or a 7×7 array rather than the above-mentioned 3×3 array. This invention is not limited. The convolution units PE can simultaneously execute multiple convolution operations for processing different sets of inputted data.

Figure 4:
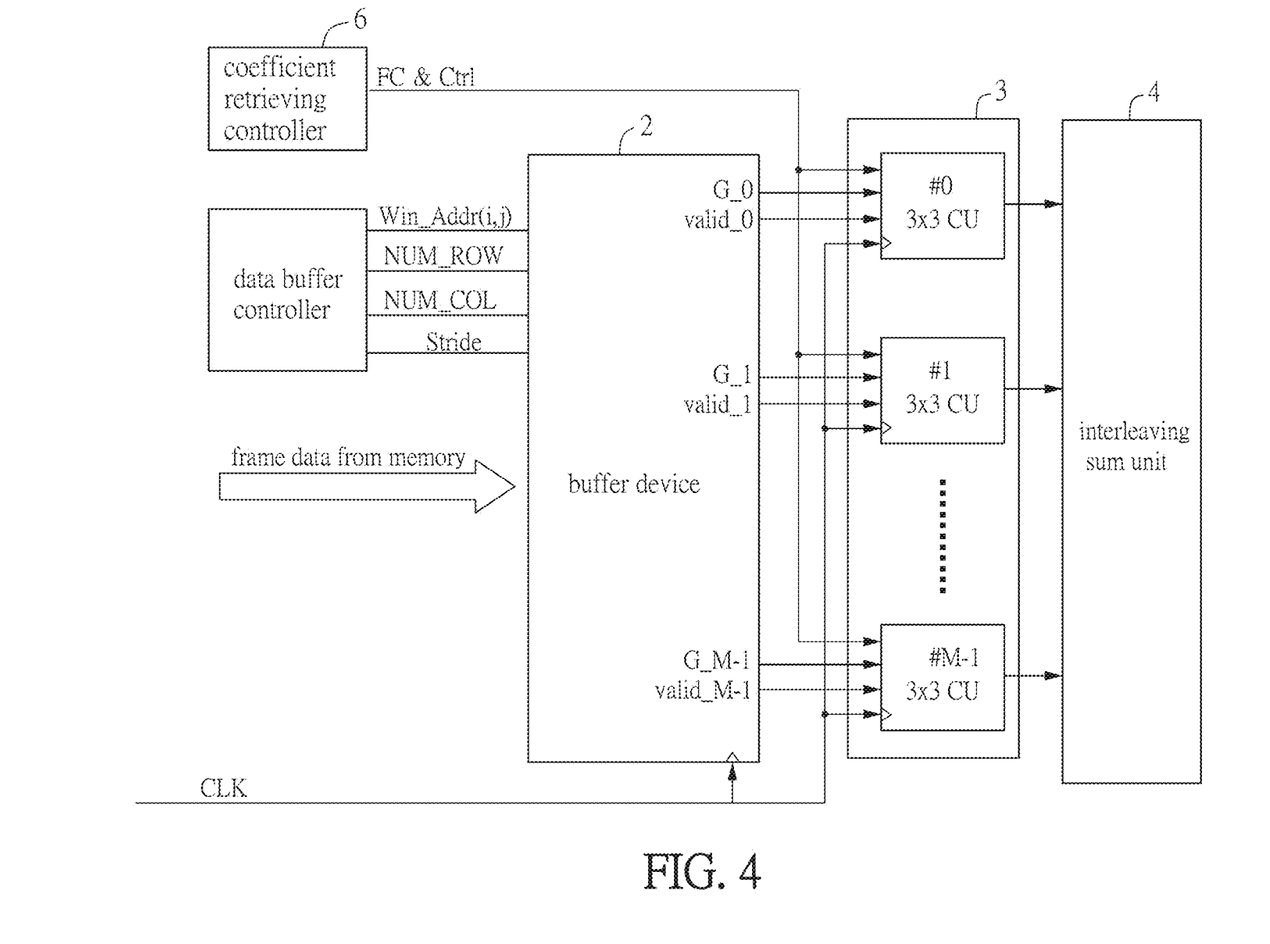
FIG. 4 is a schematic diagram showing a part of the convolution operation device of FIG. 1.

FIG. 4 is a schematic diagram showing a part of the convolution operation device of FIG. 1. As shown in FIG. 4, the coefficient retrieving controller 6 is coupled to the 3×3 convolution units of the convolution operation module 3 through the lines of the filter coefficients FC and control signals Ctrl. After retrieving the instruction, convolution information and data, the buffer device 2 can control the convolution units to perform convolution operations.

The interleaving sum unit 4 is coupled to the convolution operation module 3. The convolution operation module 3 can perform operation according to different feature of the inputted data and output the feature operation results. Regarding to the data writing with multiple feature, the convolution operation module 3 can output a plurality of operation results correspondingly. The interleaving sum unit 4 is configured to combine the operation results outputted from the convolution operation module 3 for obtaining an output feature result. After obtaining the output feature result, the interleaving sum unit 4 transmits the output feature result to the sum buffer unit 5 for next process.

For example, the convolutional neural network has a plurality of operation layers, such as the convolutional layer and pooling layer. The convolutional neural network may have a plurality of convolutional layers and pooling layers, and the output of any of the above layers can be the input of another one of the above layers or any consecutive layer. For example, the output of the N convolutional layer is the input of the N pooling layer or any consecutive layer, the output of the N pooling layer is the input of the N+1 convolutional layer or any consecutive layer, and the output of the N operational layer is the input of the N+1 operational layer.

In order to enhance the operation performance, when performing the operation of the Nth layer, a part of the operation of N+i layer will be executed depending on the situation of the operation resource (hardware). Herein, i is greater than 0, and N and i are natural numbers. This configuration can effectively utilize the operation resource and decrease the operation amount in the operation of the N+i layer.

In this embodiment, when executing an operation (e.g. a 3×3 convolution operation), the convolution operation module 3 performs the operation for one convolutional layer of the convolutional neural network. The interleaving sum unit 4 doesn't execute a part of the operation of a consecutive layer in the convolutional neural network, and the sum buffer unit 5 executes an operation for the pooling layer of the same level in the convolutional neural network. When executing another operation (e.g. a 1×1 convolution operation (a low-scale convolution mode)), the convolution operation module 3 performs the operation for one convolutional layer of the convolutional neural network. The interleaving sum unit 4 executes a part of the operation (e.g. a sum operation) of a consecutive layer in the convolutional neural network, and the sum buffer unit 5 executes an operation for the pooling layer of the same level in the convolutional neural network. In other embodiments, the sum buffer unit 5 can execute not only the operation of the pooling layer, but also a part of the operation of a consecutive layer in the convolutional neural network. Herein, a part of the operation can be a sum operation, an average operation, a maximum value operation, or other operations of a consecutive layer, and it can be executed in the current layer of the convolutional neural network.

Figure 5:
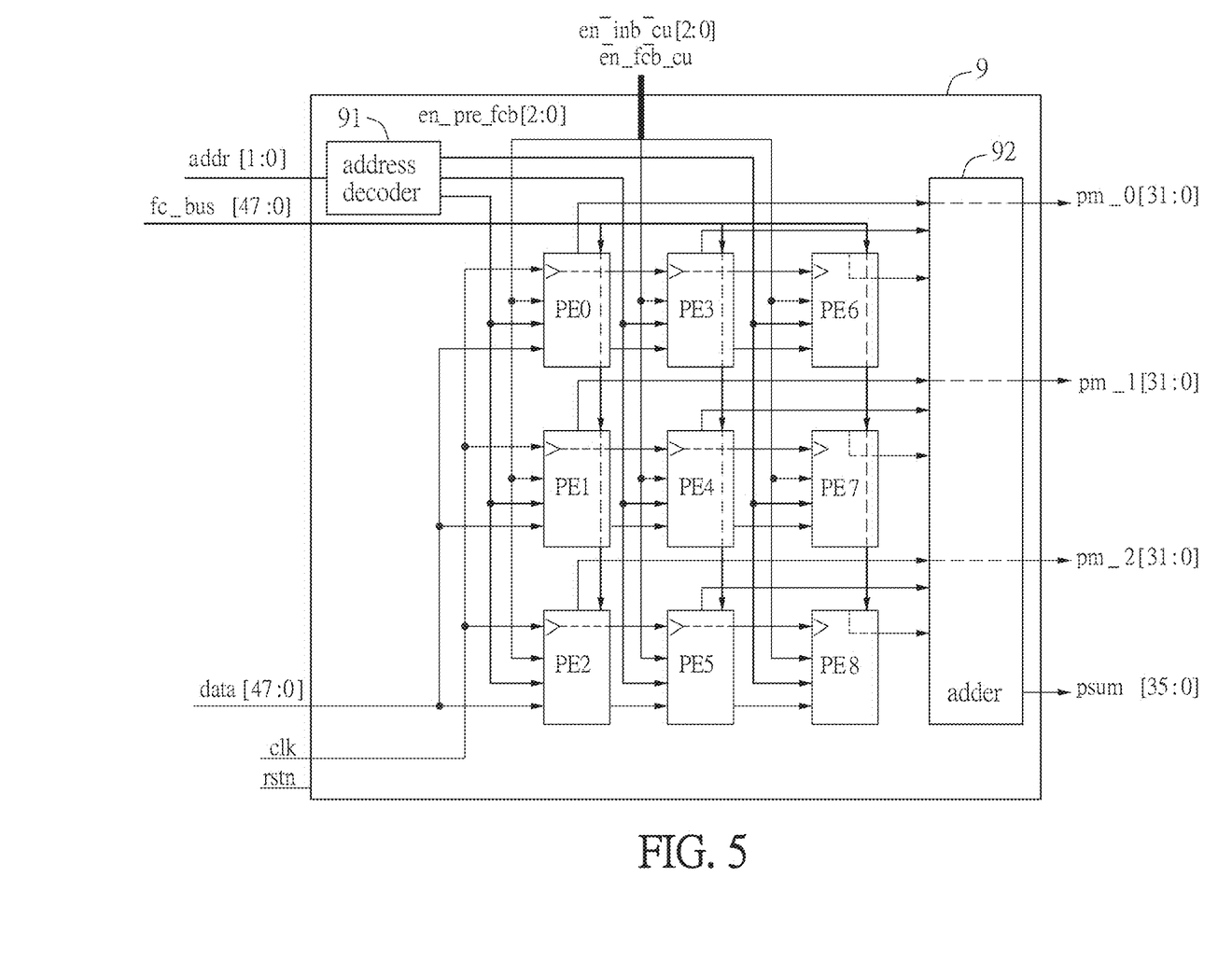
FIG. 5 is a block diagram showing a convolution unit according to an embodiment of the invention.

FIG. 5 is a block diagram showing a convolution unit according to an embodiment of the invention. As shown in FIG. 5, the convolution unit 9 includes 9 processing engines PE0~PE8, an address decoder 91, and an adder 92. The convolution unit 9 can be any of the above-mentioned convolution units.

In a 3×3 convolution operation mode (e.g. a high-scale convolution mode), the inputted data for the convolution operation are inputted to the process engines PE0~PE2 through the line data[47:0]. The process engines PE0~PE2 input the inputted data of the current clock to the process engines PE3~PE5 in the next clock for next convolution operation. The process engines PE3~PE5 input the inputted data of the current clock to the process engines PE6~PE8 in the next clock for next convolution operation. The 3×3 filter coefficient can be inputted to the process engines PE0~PE8 through the line fc_bus[47:0]. If the stride is 1, 3 new data can be inputted to the process engines, and 6 old data are shifted to other process engines. When executing the convolution operation, the process engines PE0~PE8 execute multiplications of the inputted data, which are inputted to the PE0~PE8, and the filter coefficients of the addresses selected by the address decoder 91. When the convolution unit 9 executes a 3×3 convolution operation, the adder 92 obtain a sum of the results of multiplications, which is the output psum [35:0].

When the convolution unit 9 performs a 1×1 convolution operation (e.g. a low-scale convolution mode), the inputted data for the convolution operation are inputted to the process engines PE0~PE2 through the line data[47:0]. Three 1×1 filter coefficients are inputted to the process engines PE0~PE2 through the line fc_bus[47:0]. If the stride is 1, 3 new data can be inputted to the process engines. When executing the convolution operation, the process engines PE0~PE2 execute multiplications of the inputted data, which are inputted to the PE0~PE2, and the filter coefficients of the addresses selected by the address decoder 91. When the convolution unit 9 executes a 1×1 convolution operation, the adder 92 directly uses the results of the convolution operations of the process engines PE0~PE2 as the outputs pm_0 [31:0], pm_1 [31:0], and pm_2 [31:0]. In addition, since the residual process engines PE3~PE8 don't perform the convolution operations, they can be temporarily turned off for saving power. Although the outputs of the convolution units 9 include three 1×1 convolution operations, it is possible to select two of the convolution units 9 to couple to the interleaving sum unit 4. Alternatively, three convolution units 9 can be coupled to the interleaving sum unit 4, and the number of the 1×1 convolution operation results to be outputted to the interleaving sum unit 4 can be determined by controlling the ON/OFF of the process engines PE0~PE2.

After the convolution operation module 3, the interleaving sum unit 4 and the sum buffer unit 5 all process the entire image data, and the final data process results are stored in the memory 1, the buffer device 2 outputs stop signal to the instruction decoder 71 and the control unit 7 for indicating that the current operations have been finished and waiting the next process instruction.

In addition, a convolution operation method for a data stream includes the following steps of: sliding a convolution operation window; retrieving data, which are not processed in a previous convolution operation, from the data stream; performing a current convolution operation with data left in a convolution operation module and the data retrieved from the data stream according to a filter coefficient of the convolution operation window; and leaving a part of the data for the current convolution operation in the convolution operation module, wherein the left part of the data is provided for a next convolution operation. Afterwards, the above steps can be repeated. For example, the convolution operation module includes convolution operation units or array. Otherwise, the convolution operation module may include mathematic operation units and internal register for performing the desired convolution operations. The internal register can save a part of the data for the current convolution operation for the convolution operation module to perform the next convolution operation. The data stream is stored in the memory, and the stride of the convolution operation window is smaller than the shortest width of the convolution operation window.

In addition, the convolution operation method further includes a step of: performing a partial operation for a consecutive layer of a convolutional neural network according to the results of the current convolution operation. Herein, the partial operation for a consecutive layer can be a sum operation, an average operation, a maximum value operation, or other operations, and it can be executed in the current layer of the convolutional neural network.

In addition, the convolution operation method further includes the following steps of: selecting one of a low-scale convolution mode and a high-scale convolution mode for performing the convolution operation; and when selecting the low-scale convolution mode, summing results of the convolution operations of the convolution operations corresponding to modules by interleaving so as to output sum results.

In addition, the convolution operation method further includes a step of: performing a pooling operation with the results of the convolution operations. Herein, the pooling operation is a max pooling or an average pooling.

The convolution operation method can be applied to the convolution operation device in the previous embodiment, and the modifications and application details will be omitted here. The convolution operation method can also be applied to other computing devices. For example, the convolution operation method for a data stream can be performed in a processor that can execute instructions. The instructions for performing the convolution operation method are stored in the memory. The processor is coupled to the memory for executing the instructions so as to performing the convolution operation method. For example, the processor includes a cache memory, a mathematical operation unit, and an internal register. The cache memory is configured for storing the data stream, and the mathematical operation unit is configured for executing the convolution operation. The internal register can leave a part data of the current convolution operation in the convolution operation module, which are provided for the next convolution operation.

In summary, each convolution unit of the convolution operation device can leave a part of the current data after the convolution operation, and the buffer device retrieves a plurality of new data and inputs the new data to the convolution unit. The new data is not a duplicate of the current data. Thus, the performance of the convolution operation can be enhanced, so that this invention is suitable for the convolution operation for data stream. When performing data process by convolution operation and continuous parallel operation, the operation performance and low power consumption expressions are excellent, and these operations can be applied to process data stream.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

The invention claimed is:

1. A convolution operation device, comprising:
   a convolution operation module having a plurality of convolution units, wherein each of the convolution units including multipliers to perform a convolution operation according to a filter and a plurality of current data at a first cycle, and leaves a part of the current data at the corresponding one of the convolution units after the convolution operation at the first cycle;
   a memory; and
   a buffer device coupled to the memory and the convolution operation module, wherein the buffer device retrieves a plurality of new data from the memory and inputs the new data to the convolution units after the first cycle, and the new data are not a duplicate of the current data;
   a data reading controller; and
   an instruction decoder receiving a control instruction from the data reading controller and decoding the control instruction for obtaining a size, a number of columns, a number of rows, a feature number of data inputted from the memory, and an initial address of the inputted data in the memory;
   wherein, the each of convolution units performs a next convolution operation at a second cycle according to the filter, the left part of the current data, and the new data.

2. The convolution operation device of claim 1, wherein a stride for moving the filter is smaller than a shortest width of the filter.

3. The convolution operation device of claim 1, wherein each of the convolution units comprises:
   a plurality of low-scale convolution outputs, wherein each of the convolution units performs a low-scale convolution operation for outputting the convolution result; and a plurality of high-scale convolution outputs, wherein each of the convolution units outputs performs a high-scale convolution operation for outputting a high-scale convolution result.

4. A convolution operation method for a data stream, comprising steps of:
sliding a convolution operation window;
retrieving new data, which are not processed in a previous convolution operation, from the data stream;
performing a current convolution operation with previous part data in a convolution operation module and the new data retrieved from the data stream according to a filter coefficient of the convolution operation window, wherein the previous part data is left at the convolution operation module at the previous convolution operation;
leaving a part of the data for the current convolution operation in the convolution operation module, wherein the left part of the data is provided for a next convolution operation;
selecting one of a low-scale convolution mode and a high-scale convolution mode for performing the current convolution operation; and
when selecting the low-scale convolution mode, summing results of the current convolution operation of the convolution operations module and results of an additional current convolution operation of an additional convolution operations module by interleaving with using an interleaving sum unit so as to output sum results.

5. The convolution operation method of claim 4, wherein a stride for a sliding window of the convolution operation is smaller than a shortest width of the sliding window.

6. The convolution operation method of claim 4, further comprising a step of:
performing a pooling operation with the results of the current convolution operation.

7. The convolution operation method of claim 6, wherein the pooling operation is a max pooling or an average pooling.

* * * * *